United States Patent [19]

Yang et al.

[11] Patent Number: 5,723,570
[45] Date of Patent: Mar. 3, 1998

[54] WHOLLY AROMATIC POLYAMIDE FIBER WITH IMPROVED DYEABILITY

[75] Inventors: Jen-Chang Yang, Taipei; Jin-Chyueh Lin, Fong-San; Lien-Tai Chen, Tainan, all of Taiwan

[73] Assignee: Industrial Technology Research Institute, Taiwan

[21] Appl. No.: 413,835

[22] Filed: Mar. 30, 1995

[51] Int. Cl.$^6$ ..................... C08G 69/32
[52] U.S. Cl. ............. 528/337; 528/310; 528/322; 528/335; 528/480; 528/487; 528/488; 8/115.54; 8/115.63; 8/911; 428/357; 428/364; 428/395
[58] Field of Search ............. 528/488, 487, 528/480, 337, 310, 322, 335; 428/357, 364, 395; 8/911

[56] References Cited

U.S. PATENT DOCUMENTS

| | | | |
|---|---|---|---|
| 3,287,324 | 11/1966 | Sweeney | 528/335 |
| 3,886,251 | 5/1975 | Sekiguchi et al. | 264/184 |
| 3,888,821 | 6/1975 | Milford, Jr. | 528/335 |
| 4,317,902 | 3/1982 | Hinderer | 528/337 |
| 5,198,119 | 3/1993 | Berger et al. | 210/654 |
| 5,216,114 | 6/1993 | Walles et al. | 528/487 |
| 5,322,922 | 6/1994 | Berger et al. | 528/320 |

*Primary Examiner*—P. Hampton-Hightower
*Attorney, Agent, or Firm*—Sughrue, Mion, Zinn, Macpeak & Seas, PLLC

[57] ABSTRACT

A wholly aromatic polyamide fiber containing above about 600 ppm (about 0.2 mole percent) of sulfonate in the polymer main chain is provided. The sulfonate is represented by the general formulas (III) or (IV):

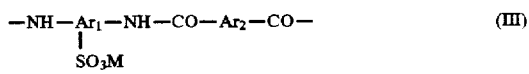

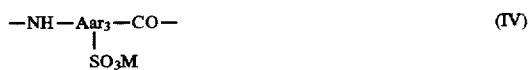

where M is hydrogen, a metal cation, or a quaternary ammonium ion. The fiber exhibits excellent dyeability and can be cation-dyed without the use of a dye carrier.

13 Claims, No Drawings

WHOLLY AROMATIC POLYAMIDE FIBER WITH IMPROVED DYEABILITY

FIELD OF THE INVENTION

The present invention relates to a wholly aromatic polyamide fiber with improved dyeability, and in particular to a fiber of modified poly (m-phenylene isophthalamide)(MPD-I) and its related copolymers with improved dyeability.

BACKGROUND OF THE INVENTION

Wholly aromatic polyamide fibers, such as the fiber of poly (m-phenylene isophthalamide), have been known for a long time [W. Sweeny, U.S. Pat. No. 3,287,324 (1966)]. This fiber generally offers attractive physical properties suitable for industrial applications, such as high thermal and oxidative stability, good flame resistance, high electrical resistance, and textile-like performance. For this reason, MPD-I fiber was first commercialized by E. I. du Pont de Nemours & Co., Inc. in 1962 under the tradename of NOMEX aramid fiber. Teijin Ltd. of Japan later commercialized this fiber under the tradename of TEIJINCONEX, and the former Soviet Union also produced this fiber industrially under the tradename of FENILON. Products of MPD-I fiber are widely used in thermal protective apparel, automotive hose reinforcement, industrial filtration and industrial paper.

An inherent difficulty in the processing of MPD-I fiber is its poor dyeability. [H. H. Yang, "NOMEX Aramid Fiber", in "Handbook of Fiber Science and Technology, Vol. III, High Technology Fibers", M. Lewin and J. Preston, ed., Marcel Dekker, New York (1993)] Filament yarns of MPD-I fiber are normally not recommended for customer dyeing, but are producer-colored by special processing techniques such as spun-in pigmentation [Teijin Ltd., Jap. Pat. Appl. 26,207 and 26,208 (1980)]. Staple products of MPD-I fiber in the form of spun yarn or fabric can be dyed or printed with cationic dyes in combination with proprietary dye carriers. [C. Soiron and K. Keller, Can. Pat. 1,070,905 (1980); Ciba Geigy AG, Ger. Pat. 2,941,763] A few methods for improving the dyeability of MPD-I have been reported in recent years, including polymer blends of MPD-I and another aromatic polyamide e.g., poly (m-oxylene isophthalamide) [Teijin Ltd., Jap. Pat. Appl. 21406 and 21407,(1980); Y. Nakagawa et al., U.S. Pat. No. 4,278,779 (1981)], and the formation of a skin-core fiber structure during coagulation [Teijin Ltd., Jap. Pat. Appl. 142,717 (1980)]. These methods necessitate producer coloration at increased costs.

SUMMARY OF THE INVENTION

It is therefore an object of this invention to provide a modified wholly aromatic polyamide fiber of reasonable cost which can be customer-colored in the form of continuous filament yarn, staple, spun yarn, woven or nonwoven fabric.

It has been found in this invention that the dyeability of wholly aromatic polyamide fibers can be improved substantially by sulfonation without significantly affecting their general properties.

DETAILED DESCRIPTION OF THE INVENTION

The term "wholly aromatic polyamide" according to this invention refers to a liner polymer containing at least 85 mole percent of recurring structural units represented by the following general formulas (I) or (II):

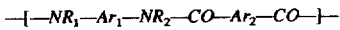  (I)

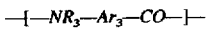  (II)

wherein $Ar_1$, $Ar_2$ and $Ar_3$ are aromatic radicals, and $Ar_1$ and $Ar_2$ are the same or different, $R_1$, $R_2$ and $R_3$ are a lower alkyl group or hydrogen, and $R_1$ and $R_2$ are the same or different. According to the present invention, the wholly aromatic polyamide fiber is sulfonated so that it contains at least about 0.2 mole percent of sulfonate in the polymer main chain as represented by the general formulas (III) or (IV):

$$-NH-Ar_1-NH-CO-Ar_2-CO- \quad (III)$$
$$\qquad\qquad |$$
$$\qquad\qquad SO_3M$$

$$-NH-Aar_3-CO- \quad (IV)$$
$$\qquad |$$
$$\qquad SO_3M$$

wherein M is hydrogen, a metal cation or a quaternary ammonium ion. Examples of the metal cation include cations of aluminum, iron, lead, and metals of groups IA, IIA and IIB of the periodic table.

An example of the wholly aromatic polyamide fiber is poly(m-phenylene isophthalamide) and its related copolymers containing at least 85 mole percent of repeat units of m-phenylene isophthalamide as represented by the following formula:

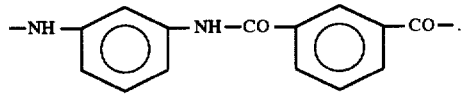

The sulfonation of a wholly aromatic polyamide fiber in this invention is accomplished by exposing the fiber to a sulfuric acid or chlorosulfuric acid aqueous solution for a predetermined period of time, which gives rise to a controlled amount of sulfonated repeat units of $$-NH-Ar_1-NH-CO-Ar_2-CO- \quad \text{or}$$
$$\qquad\qquad |$$
$$\qquad\qquad SO_3H$$

$$-NH-Ar_3-CO-$$
$$\qquad |$$
$$\qquad SO_3H$$

in the polymer main chain.

The fiber is passed through or immersed in a bath of about 60 to about 90 weight percent sulfuric acid or chlorosulfuric acid aqueous solution at about 0° to about 90° C. for a period of about 2 seconds to about 10 minutes. The resulting fiber contains above about 600 ppm, or about 0.2 mole percent and lower than about 70 mole percent of sulfonate based on the polymer weight, and can be dyed with a cationic dye without the use of a dye carrier.

The above sulfonated fiber can then be subjected to a metal hydroxide solution, e.g., a sodium hydroxide solution, or a quaternary ammonium ion solution, to neutralize the sulfonated fiber. This neutralization step is optional. The resulting neutralized fiber contains a sulfonate group in the polymer main chain as represented by the general formulas (III) or (IV):

$$-NH-Ar_1-NH-CO-Ar_2-CO- \quad (III)$$
$$\qquad |$$
$$\qquad SO_3M$$

-continued

(IV)

wherein M is a metal cation or a quaternary ammonium ion. M is defined as previously set forth for the formulas (III) and (IV).

The invention will now be described in greater detail with reference to the following non-limiting examples.

EXAMPLE 1

An 80 wt % sulfuric acid aqueous solution was prepared by gradually adding 200 grams of 97% concentrated sulfuric acid into 42.5 grams of water in a 1-liter jacketed cylindrical glass reactor. The sulfuric acid solution was gently stirred and held at about 25° C. by the circulation of water through the reactor jacket. Sections of 1.5 grams of NOMEX aramid Type 430 filament yarn manufactured by E. I. du Pont de Nemours & Co. Inc. were taken and immersed in the 80 wt % sulfuric acid solution at about 25° C. for various periods of time: 0.5, 1.0, 1.5, and 2.0 minutes, respectively. The treated filaments were washed with water for 1 minute and placed into a neutralization bath containing 1 M sodium hydroxide solution for 5 minutes at ambient temperature. To remove any residual materials, the fibers were washed and rinsed with excess water and subsequently dried in air.

To evaluate the dyeability of the modified MPD-I filaments, a stock solution of Diacryl Red (GRL-PN 200%) from Hoechst Mitsubishi Kasei Co. Ltd. was prepared. The single dye shade was produced by adding aliquots of a 1% stock solution of cationic dye to achieve a 5% O.W.F. ("On Weight of Fabric") dyebath solution. The dye bath was then adjusted to a 20:1 liquor-to-fiber weight ratio. The filaments were dyed with a cationic dye in a Launderometer at a temperature of 80° C. for 30 minutes, washed and rinsed with excess boiling water and soaked in water for 12 hours, and finally dried in air for another 12 hours.

The color parameters of the dyed filaments were determined using an Elrepho Datacolor 2000 measurement system. A cell containing 1.5 g of dyed MPD-I filaments was placed in a spectrophotometer to measure its reflectance (R). Using a light source D65 and a 2° viewing angle, Hunter L, a, and b values were recorded. In addition, the percent reflectance (R) was measured at the wavelength of maximum absorption and used to establish the depth of shade. According to the Kubelka-Munk function, the K/S value of the specimen was determined in accordance with the following equation.

$$\frac{K}{S} = \frac{(1-R)^2}{2R}$$

where K and S are the absorption and scattering coefficients, respectively. The depth of shade or the dye uptake refers to the amounts of the cationic dye that were absorbed and retained by the fibers. The K/S value varies approximately linearly with the concentration of dye on the material.

The color difference between dyed filament samples before and after 170 hr exposure to sun-light in a Lab Color Space is given by $\Delta E=[(\Delta L)^2+(\Delta a)^2+(\Delta b)^2]^{0.5}$. The number of $\Delta E$ (CIELAB) units can be used as an index for the light fastness of a dyed specimen.

In general, a decrease in reflectance and an increase in K/S value indicate an increase in dyeability and the depth of shade. An increase in color difference tends to indicate a declining trend in light fastness of a dyed specimen.

The sulfur content of the sulfonated MPD-I filament yarn was also measured. The sulfonated MPD-I filament yarns were carefully dried and weighed before being placed in a Schoniger flask for combustion with pure oxygen. The combustion gas, which contained $SO_2$ and $SO_3$, was absorbed in water to form sulfuric acid. The sulfur content of the filaments was detected by an Inductively Coupled Plasma Atomic Emission Spectrophotometer (ICP-AES). The results on three filaments were averaged.

The process conditions and results of reflectance, K/S, and sulfur content are summarized in Table 1.

EXAMPLE 2

This example illustrates the alternate process conditions for the modification of MPD-I filaments. The process of Example 1 was repeated except that the water wash temperature was changed from 25° C. to 0° C. for the specimen treated with an 80 wt % sulfuric acid solution at about 25° C. for 1.5 minutes. The results of reflectance, K/S and the color difference ΔE(CIELAB) are summarized in Table 1. Generally speaking, the treated filaments of MPD-I were readily dyeable to deep shades.

COMPARATIVE EXAMPLE 1

The dyeing process and color measurements of Example 1 were repeated for an untreated NOMEX aramid Type 430 filament yarn. The results of reflectance (%), and a K/S of this fiber without the modification of this invention are also summarized in Table 1. The untreated MPD-I fiber of NOMEX aramid showed very little dyeing in the absence of a dye carrier.

TABLE 1

| Immersion Time in 80% $H_2SO_{4(aq)}$, 25° C. | Reflectance (%) | K/S | Sulfur Content (ppm) |
| --- | --- | --- | --- |
| None (untreated) | 0.2684 | 1.00 | 0 |
| 0.5 min | 0.0432 | 10.60 | 620 |
| 1.0 min | 0.0296 | 15.91 | 470 |
| 1.5 min | 0.0283 | 16.68 | 420 |
| 2.0 min | 0.0339 | 13.77 | 520 |
| 1.5 min followed by water wash at | | | |
| 25° C. | 0.0283 | 16.68 | |
| 0° C. | 0.0263 | 18.02 | |

EXAMPLE 3

Pieces of 4×8 cm supported needle felts of NOMEX aramid were treated by the processes of Example 1. The process conditions and results of reflectance and K/S are listed in Table 2. These treated felts of MPD-I were readily dyeable to deep shades.

The dyed felt pieces of this example were exposed to sunlight for about 170 hr. The color parameters of the light exposed felt pieces were measured, and the color difference ΔE (CIELAB) was calculated. Results are also summarized in Table 2. These felts showed good dye fastness to sunlight.

COMPARATIVE EXAMPLE 2

Additional felt specimens of Example 3, which were not treated with the process of Example 3, were dyed and exposed to sunlight for about 170 hr. The color parameters and the color difference ΔE (CIELAB) after 170 hr sunlight exposure were measured. Results of these measurements are summarized in Table 2. In general, these untreated felts of MPD-I showed poor dyeability and poor dye fastness.

TABLE 2

| Immersion Time in 80% $H_2SO_{4(aq)}$, 25° C. | None | 0.5 min | 1.0 min | 1.5 min | 2.0 min |
|---|---|---|---|---|---|
| Before 170 hr sunlight | | | | | |
| L | 69.249 | 39.834 | 35.634 | 35.163 | 34.004 |
| a | 24.046 | 55.637 | 55.873 | 54.797 | 54.235 |
| b | 2.788 | 10.814 | 16.814 | 17.199 | 20.675 |
| Reflectance (%) | 0.1847 | 0.0219 | 0.0194 | 0.0196 | 0.0189 |
| K/S | 1.799 | 21.842 | 24.783 | 24.520 | 25.460 |
| After 170 hr sunlight | | | | | |
| L | 61.821 | 35.762 | 33.595 | 35.062 | 32.574 |
| a | 37.612 | 55.749 | 54.921 | 57.516 | 53.532 |
| b | −8.991 | 4.495 | 9.994 | 9.527 | 15.336 |
| Reflectance (%) | 0.2972 | 0.0263 | 0.0196 | 0.0205 | 0.0191 |
| K/S | 0.831 | 18.025 | 24.025 | 23.401 | 25.188 |
| ΔE (CIELAB) due to 170 hr sunlight exposure | 19.44 | 7.52 | 7.18 | 8.14 | 5.57 |

While the invention has been described in detail and with reference to specific embodiments thereof, it will be apparent to one skilled in the art that various changes and modifications can be made therein without departing from the spirit and scope thereof.

What is claimed is:

1. A fiber of wholly aromatic polyamide containing at least 85 mole percent of recurring structural units represented by the following general formulas (I) or (II):

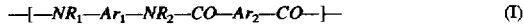
$$-\!\!\!-\!\!\!(-NR_1-Ar_1-NR_2-CO-Ar_2-CO-\!\!\!)-\!\!\!- \quad (I)$$

$$-\!\!\!-\!\!\!(-NR_3-Ar_3-CO-\!\!\!)-\!\!\!- \quad (II)$$

wherein $Ar_1$, $Ar_2$ and $Ar_3$ are aromatic radicals, and $Ar_1$ and $Ar_2$ are the same or different, $R_1$, $R_2$ and $R_3$ are a lower alkyl group or hydrogen, and $R_1$ and $R_2$ are the same or different, and containing at least about 0.2 mole percent of sulfonate in the polymer main chain as represented by the general formulas (III) or (IV):

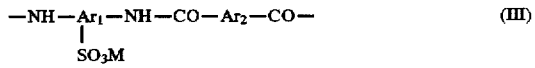
```
—NH—Ar₁—NH—CO—Ar₂—CO—        (III)
     |
     SO₃M
```

```
—NH—Aar₃—CO—                  (IV)
     |
     SO₃M
``` wherein M is hydrogen, a metal cation, or a quaternary ammonium ion.

2. The fiber of claim 1, wherein M is hydrogen.

3. The fiber of claim 1, wherein the sulfonate of general formula (III) is represented by:

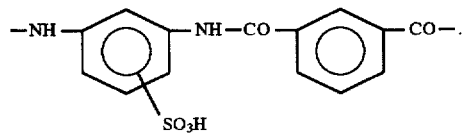

4. The fiber of claim 1, wherein M is a metal cation or a quaternary ammonium ion.

5. The fiber of claim 4, wherein M is a metal cation.

6. The fiber of claim 4, wherein the sulfonate of general formula (III) is represented by

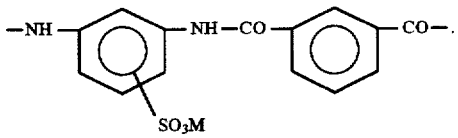

7. A process for the preparation of the fibers of claim 2, comprising the following step:

contacting a fiber of wholly aromatic polyamide of recurring units represented by the following general formulas (I) or (II):

$$-\!\!\!-\!\!\!(-NR_1-Ar_1-NR_2-CO-Ar_2-CO-\!\!\!)-\!\!\!- \quad (I)$$

$$-\!\!\!-\!\!\!(-NR_3-Ar_3-CO-\!\!\!)-\!\!\!- \quad (II)$$

wherein $Ar_1$, $Ar_2$ and $Ar_3$ are aromatic radicals, and $Ar_1$ and $Ar_2$ are the same or different, $R_1$, $R_2$ and $R_3$ are a lower alkyl group or hydrogen, and $R_1$ and $R_2$ are the same or different; to an about 60 to about 90 weight percent sulfuric acid or chlorosulfuric acid aqueous solution at about 0° to about 90° C. for a period of about 2 seconds to about 10 minutes.

8. The process of claim 7, wherein the wholly aromatic polyamide is poly(m-phenylene isophthalamide).

9. The process of claim 8, wherein said exposing step comprises immersing said fiber of wholly aromatic polyamide in an about 80 weight percent solution of sulfuric acid at about 25° C. for about 0.5 to about 2 minutes.

10. A process for the preparation of the fibers of claim 4, comprising the following steps:

(a) contacting a fiber of wholly aromatic polyamide of recurring units represented by the following general formulas (I) and (II):

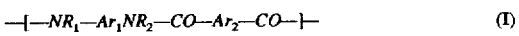
$$-\!\!\!-\!\!\!(-NR_1-Ar_1NR_2-CO-Ar_2-CO-\!\!\!)-\!\!\!- \quad (I)$$

$$-\!\!\!-\!\!\!(-NR_3-Ar_3-CO-\!\!\!)-\!\!\!- \quad (II)$$

wherein $Ar_1$, $Ar_2$ and $Ar_3$ are aromatic radicals, and $Ar_1$ and $Ar_2$ are the same or different, $R_1$, $R_2$ and $R_3$ are a lower alkyl group or hydrogen, and $R_1$ and $R_2$ are the same or different; to an about 60 to about 90 weight percent sulfuric acid or chlorosulfuric acid aqueous solution at about 0° to about 90° C. for a period of about 2 seconds to about 10 minutes; and (b) neutralizing the fiber obtained from step (a) to a metal hydroxide or quaternary ammonium ion solution.

11. The process of claim 10, wherein the wholly aromatic polyamide is poly(m-phenylene isophthalamide).

12. The process of claim 11, wherein said contacting step (a) comprises immersing said fiber of wholly aromatic polyamide in an about 80 weight percent aqueous solution of sulfuric acid at about 25° C. for about 0.5 to about 2 minutes.

13. The process of claim 12, wherein said subjecting step (b) comprises subjecting the fiber obtained from step (a) to an about 1 M sodium hydroxide solution at ambient temperature.

* * * * *